United States Patent
Arbab et al.

(10) Patent No.: US 7,691,763 B2
(45) Date of Patent: Apr. 6, 2010

(54) HIGH PERFORMANCE BLUE GLASS

(75) Inventors: Mehran Arbab, Pittsburgh, PA (US);
Robert B. Heithoff, Gibsonia, PA (US);
Larry J. Shelestak, Bairdford, PA (US);
Dennis G. Smith, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 438 days.

(21) Appl. No.: 11/713,197

(22) Filed: Mar. 2, 2007

(65) Prior Publication Data

US 2007/0214833 A1 Sep. 20, 2007

Related U.S. Application Data

(63) Continuation of application No. 10/767,914, filed on Jan. 29, 2004, now abandoned.

(51) Int. Cl.
*C03C 3/095* (2006.01)
*C03C 3/087* (2006.01)
(52) U.S. Cl. .............................. 501/64; 501/70; 501/71
(58) Field of Classification Search .................. 501/64, 501/70, 71
See application file for complete search history.

(56) References Cited

U.S. PATENT DOCUMENTS 5,688,727 A * 11/1997 Shelestak et al. .............. 501/71
6,313,053 B1 * 11/2001 Shelestak ..................... 501/71

FOREIGN PATENT DOCUMENTS

| GB | 2274841 | * | 8/1994 |
| JP | 2000-327366 | * | 11/2000 |
| JP | 2002293568 | * | 10/2002 |

* cited by examiner

*Primary Examiner*—Karl E Group
(74) *Attorney, Agent, or Firm*—Andrew C. Siminerio

(57) ABSTRACT

A glass composition for forming a blue colored glass is disclosed. The glass composition is made up of a base glass portion, iron oxide, and at least one first additive compound selected from $Nd_2O_3$ in an amount up to 1 weight percent and/or CuO in an amount up to 0.5 weight percent. The base glass portion has the following components: $SiO_2$ from 66 to 75 weight percent; $Na_2O$ from 10 to 20 weight percent; CaO from 5 to 15 weight percent; MgO from 0 to 5 weight percent; $Al_2O_3$ from 0 to 5 weight percent; $B_2O_3$ from 0 to 5 weight percent; and $K_2O$ from 0 to 5 weight percent. The total iron in the glass composition ranges from 0.3 to 1.2 weight percent, and the glass composition has a redox ratio ranging from 0.15 to 0.65.

13 Claims, No Drawings

HIGH PERFORMANCE BLUE GLASS

CROSS-REFERENCE TO RELATED APPLICATION

This application is a continuation of U.S. patent application Ser. No. 10/767,914, filed on Jan. 29, 2004 which is now abandoned and is incorporated herein by reference in its entirety.

FIELD OF THE INVENTION

The present invention relates to glass compositions for forming a blue colored glass; especially glass compositions comprising iron oxides, neodymium oxide and/or copper oxide.

BACKGROUND

Glass is used in a variety of products ranging from buildings to automotive products. Depending on the end use of the glass, the glass will be required to have certain color and other performance properties like infrared radiation absorption, ultraviolet radiation absorption, visible light absorption, total solar energy absorption, etc.

In order to produce glass having a specific color and other performance properties, various additives are added to a base glass composition. A typical base glass composition comprises $Na_2O$, $CaO$, $MgO$, $Al_2O_3$, $SiO_2$ and $K_2O$. Typical additives to a base glass composition include compounds containing iron, cobalt, nickel, selenium, chromium, titanium, etc.

For certain commercial applications, blue colored glass having certain solar performance is required. A multitude of compositions for forming blue glass are well known to those of skill in the art. For example, U.S. Pat. No. 6,313,053 discloses a composition that yields a blue colored glass. To form the blue glass, additives such as ferric oxide ($Fe_2O_3$) and a reducing agent such as coal are added to a base glass composition. The reducing agent is used to control the amount of ferrous oxide (FeO) in the composition.

Glass compositions having a lower redox ratio are generally preferred over those having a higher redox ratio because glass compositions having a lower redox ratio are easier to melt, refine, and cool, therefore generally less costly to process.

The present invention provides a novel glass composition for forming blue colored glass comprising iron oxides, neodymium oxide and/or copper oxide. The glass composition of the present invention can have an iron redox ratio of 0.15 to 0.65, for example, from 0.25 to 0.50, and solar energy blocking properties.

SUMMARY OF THE INVENTION

In one non-limiting embodiment, the present invention is a glass composition for forming a blue colored glass having a base glass portion comprising: $SiO_2$ from 66 to 75 weight percent, $Na_2O$ from 10 to 20 weight percent, $CaO$ from 5 to 15 weight percent, $MgO$ from 0 to 5 weight percent, $Al_2O_3$ from 0 to 5 weight percent, $B_2O_3$ from 0 to 5 weight percent, and $K_2O$ from 0 to 5 weight percent, and additives consisting essentially of: total iron from about 0.3 to 1.2 weight percent; at least one first additive compound selected from $Nd_2O_3$ in an amount up to 1 weight percent and/or CuO in an amount up to 0.5 weight percent; and optionally one or more second additive compounds selected from CoO, $Cr_2O_3$, $V_2O_5$, $CeO_2$, $H_2O$, $SO_3$, $TiO_2$, ZnO, $MoO_3$, NiO, Se, $La_2O_3$, $WO_3$, $Er_2O_3$, $SnO_2$, and $MnO_2$, wherein the iron redox ratio of the composition ranges from 0.15 to 0.65.

In another non-limiting embodiment, the present invention provides a method for making blue colored glass comprising: mixing a glass composition as discussed above; and melting the glass composition.

DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.8, 3 to 4.5, 6.3 to 1 0.

The present invention is a glass composition for a blue colored glass. The glass composition of the present invention comprises a base glass composition and additives consisting essentially of iron oxide, at least one first additive compound selected from $Nd_2O_3$ and/or CuO, and optionally one or more second additive compounds, which are described below in more detail.

The components of the base glass composition are shown in the table below.

| Component | Weight percent range based on the total weight of the composition |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $B_2O_3$ | 0 to 5 |
| $K_2O$ | 0 to 5 |

Additives can be added to the base glass composition to obtain the required color and/or spectral properties, such as infrared radiation absorption and ultraviolet radiation absorption. Depending on the performance requirements of the glass, the additives discussed below can be added to the base glass composition.

According to the present invention, iron oxide is added to the base glass composition. As discussed herein, iron oxide is expressed in terms of the iron oxide in the ferric state ($Fe_2O_3$) and the iron oxide in the ferrous state (FeO). The total amount of iron oxide present in the glass composition according to the present invention is expressed in terms of $Fe_2O_3$ in accordance with standard analytical practice. However, this is not meant to imply that all of the iron oxide present in the composition is in the form of $Fe_2O_3$. Similarly, when iron oxide is expressed in terms of FeO that does not mean all of the iron oxide present is in the form FeO.

Iron oxides can be added to a glass composition to perform several functions. $Fe_2O_3$ is known to those of skill in the art to be a good ultraviolet radiation absorber and a yellow colorant. FeO is known to those of skill in the art to be a good infrared radiation absorber and a blue colorant.

The term "redox ratio" is used herein to reflect the relative amounts of $Fe_2O_3$ and FeO in the glass composition. As used herein, "redox ratio" means the amount of iron as FeO in the composition divided by the total amount of iron in the composition expressed in terms of $Fe_2O_3$.

Glass compositions according to present invention have total iron ranging from 0.3 to 1.2, for example, 0.4 to 0.8 or 0.5 to 0.6 weight percent based on the total weight of the composition. The redox ratio of a glass composition according to the present invention ranges from 0.15 to 0.65, for example, 0.25 to 0.5, or 0.3 to 0.4.

In addition to iron oxide, at least one first additive compound selected from neodymium oxide ($Nd_2O_3$) and copper oxide (CuO) is added to the base glass composition according to the present invention. In a non-limiting embodiment of the invention, $Nd_2O_3$ is added to the base glass composition. $Nd_2O_3$ is known in the art to be a violet colorant. The amount of $Nd_2O_3$ in the glass composition of the present invention can range up to 1 weight percent, for example, up to 0.7 weight percent, or up to 0.25 weight percent, based on the total weight of the glass composition.

In a non-limiting embodiment of the invention, CuO is added to the base glass composition. As used herein, CuO represents both valence states of copper: cuprous, $Cu^+$ and cupric, $Cu^{2+}$. Depending on the relative amounts of cuprous and cupric present in the glass composition, the CuO will impart different properties to the final glass. Cupric is known in the art as a blue colorant and an infrared absorbing material. Cuprous is colorless in compositions according to the present invention.

The relative amounts of cuprous and cupric present in the glass composition of the invention are determined, in part, by the amount of iron oxides present, the partial pressure of $O_2$ in the atmosphere above the glass during the melting process, and the temperature of the glass. When iron and copper oxides are mixed together, copper is reduced and iron is oxidized due to their respective electrochemical potentials as is well known in the art. The amount of CuO in the glass composition of the present invention can be up to 0.5 weight percent, for example, up to 0.3 weight percent or up to 0.2 weight percent, based on the total weight of the composition.

In addition to the base glass composition constituents described above, iron oxides as described above, and $Nd_2O_3$ and/or CuO, the glass composition of the present invention can optionally include one or more of the second additive compounds described below.

In a non-limiting embodiment of the invention, cobalt (CoO) is added to the base glass composition. CoO is known in the art to be a blue colorant. The amount of CoO in the glass composition of the present invention can range up to 40 parts per million ("ppm"), for example, from 4 ppm to 30 ppm or from 5 ppm to 15 ppm.

In a non-limiting embodiment of the invention, chromium ($Cr_2O_3$) is added to the base glass composition. $Cr_2O_3$ is known to those of skill in the art to be a green colorant. It also believed that $Cr_2O_3$ can provide some ultraviolet radiation absorption. The amount of $Cr_2O_3$ in the glass composition of the present invention can range up to 100 ppm, for example, from 5 ppm to 50 ppm or from 7 ppm to 30 ppm.

In a non-limiting embodiment of the invention, vanadium ($V_2O_5$) is added to the base glass composition. $V_2O_5$ is known to those of skill in the art to act as a yellow-green colorant and an absorber of both ultraviolet and infrared radiation depending on the valence state of the vanadium compound. Also, $V_2O_5$ can be used as a partial or complete replacement for $Cr_2O_3$ in the glass composition. The amount of $V_2O_5$ in the glass composition of the present invention can range up to 0.1 weight percent, based on the total weight of the final glass composition.

Other second additive compounds that can be added the base glass composition are shown in the table below. These compounds are well known to those of ordinary skill in the art.

| Component | Weight Percent range based on the total weight of the composition |
|---|---|
| $CeO_2$ | 0 to 3 |
| $TiO_2$ | 0 to 0.5 |
| ZnO | 0 to 0.5 |
| $MoO_3$ | 0 to 0.02 (0 to 200 ppm) |
| NiO | 0 to 0.001 (0 to 10 ppm) |
| Se | 0 to 0.0003 (0 to 3 ppm) |
| $La_2O_3$ | 0 to 0.5 |
| $WO_3$ | 0 to 0.5 |
| $MnO_2$ | 0 to 0.5 |
| $Er_2O_3$ | 0 to 1 |
| $SnO_2$ | 0 to 2 |

It should be appreciated that the glass compositions disclosed herein can include small amounts of other materials, for example, melting and refining aids, tramp materials or impurities.

Glasses having different color and other performance properties can be obtained by adding combinations of the additives described above to the base glass composition. For example, in a non-limiting embodiment of the invention, $Fe_2O_3$ can be combined with $Nd_2O_3$ and/or CuO to provide a blue glass having the desired spectral properties. In a non-limiting embodiment of the invention, the blue glass has a dominant wavelength up to 500 nm.

In a non-limiting embodiment, the glass composition of the present invention is produced using a conventional float glass process, which is well known to those skilled in the art. Suitable float glass processes are disclosed in U.S. Pat. Nos. 3,083,551; 3,961,930; and 4,091,156, which are hereby incorporated by reference.

In another non-limiting embodiment of the present invention, glass can be produced using a multi-stage melting operation as disclosed in U.S. Pat. Nos. 4,381,934; 4,792,536; and 4,886,539, which are hereby incorporated by reference.

If required, a stirring arrangement that is well known in the art can be employed within the melting and/or forming stages of the glass production operation to homogenize the glass in order to produce glass of the highest optical quality.

Because float glass processes involve suspending glass on molten tin, measurable amounts of tin oxide ($SnO_2$) can migrate into portions of the glass that are in physical contact with the molten tin during forming. Typically, a piece of glass produced by a float glass process has an $SnO_2$ concentration ranging from 0 to 2.0 weight percent in the first 25 microns below the surface of the glass that was in contact with the tin. Typical background levels of $SnO_2$ in float glass can be as high as 30 ppm. Although high concentrations of $SnO_2$ in about the first 10 angstroms of the glass surface can slightly increase the reflectivity of the glass surface, the overall impact of $SnO_2$ on the properties of glass is minimal for most applications.

In a non-limiting embodiment of the present invention, sulfur oxide ($SO_3$) can be added to the base glass composition. $SO_3$ is known to those of ordinary skill in the art to be a melting and refining aid for a soda-lime-silica glass composition. Glass produced according to the present invention can include up to 0.3 weight percent $SO_3$ based on the total weight of the glass.

The combination of $Fe_2O_3$ and $SO_3$ in a glass composition can impart an amber coloration in the glass which lowers luminous transmittance as discussed in U.S. Pat. No. 4,792,536. However, it is believed that the reducing conditions required to produce the coloration in float glass compositions of the type disclosed herein are limited to approximately the first 20 microns of the lower glass surface contacting the molten tin during the float forming operation, and to a lesser extent, to the exposed upper glass surface. Because the glass has a low $SO_3$ content and/or the limited region of the glass in which any coloration could occur, depending on the particular soda-lime-silica-glass composition, $SO_3$ in these surfaces essentially has little if any material effect on the glass color or spectral properties, even if the effect could be measured. More suitably, such an effect should not amount to altering the dominant wavelength of the glass more than 3 to 5 nanometers.

Iron polysulfides, such as $FeS_x$, can also be present in the glass composition in an amount up to 10 ppm. $FeS_x$ is a byproduct of the melting process. It is believed that $FeS_x$ is formed at redox ratios above 0.50.

In a typical float glass process, water ($H_2O$) is added to the glass batch during processing to prevent dusting and segregation of the batch material. $H_2O$ can be added to the batch in an amount ranging from 2 to 4 weight percent based on the total batch weight. In the final glass composition, $H_2O$ can be present in an amount ranging up to 1,000 ppm, for example, 200 to 600 ppm, or 300 to 500 ppm.

The amount of $H_2O$ in the final glass composition will affect the infrared absorption characteristics of the glass. More particularly, increasing the amount of $H_2O$ in the glass composition will increase the infrared absorption. Flat glass produced by a process that uses oxyfuel firing during melting typically has a higher $H_2O$ content than glass produced using conventional air-fuel firing. In an oxyfuel fired melting furnace, oxygen is combined with natural gas and combusted to melt the glass batch.

Glass made according to the present invention via the float process typically has a thickness ranging from about 1 millimeter to 10 millimeters.

The glass compositions according to the present invention can be used to make glass for a variety of applications, such as but not limited to, architectural applications, automotive applications, marine applications, rail applications, etc. For automotive applications, glass produced according to the present invention typically has a thickness ranging from 0.071 to 0.197 inches (1.8 to 5 mm). Such glass can be used as automobile sidelights, automobile rear windows, or at least one ply in a multiple ply arrangement. For example, the ply can be used to make an automobile windshield comprised of two annealed glass plies which are laminated together using a polyvinyl butyral interlayer. Depending on whether the glass will be used as an automobile side light or rear window, the glass can be tempered, as is well known in the art. In a multiple ply arrangement, at least a single piece of the glass can be annealed as is well known in the art.

The spectral properties of glass can change after thermal processing, such as bending and/or tempering, or prolonged exposure to ultraviolet radiation, commonly referred to as solarization. Consequently, various embodiments of the invention are initially prepared to compensate for any losses attributable to tempering and solarization. The result is a glass product having acceptable performance properties.

EXAMPLES

The present invention is illustrated by the following non-limiting examples. Tables 1 and 2 illustrate examples of glass compositions which embody the principles of the present invention. The examples in Table 1 represent computer models generated by a glass color and spectral performance computer model developed by PPG Industries, Inc. The examples in Table 2 are actual experimental laboratory melts. To prepare the melts, the following raw materials were mixed to produce a final glass weight of approximately 700 grams:

| | |
|---|---|
| cullet* | 239.74 g |
| sand | 331.10 g |
| soda ash | 108.27 g |
| limestone | 28.14 g |
| dolomite | 79.80 g |
| salt cake | 2.32 g |
| $Fe_2O_3$ (total iron) | as required |
| CuO | as required |
| $Nd_2O_3$ | as required |
| $Co_3O_4$ | as required |

*The cullet used in the melts (which formed approximately 30% of the melt) included up to 0.51 wt. % total iron, 0.055 wt. % $TiO_2$ and 7 ppm $Cr_2O_3$.

Reducing agents were added to the mixture as required to control redox. A portion of the raw batch material was then placed in a silica crucible in a gas fired furnace and heated to 2450° F. (1343° C.). When the batch material melted, the remaining raw materials were added to the crucible, and the crucible was held at 2450° F. (1343° C.) for 30 minutes. The molten batch was then heated and held at 2500° F. (1371° C.) for 30 minutes, 2550° F. (1399° C.) for 30 minutes, and 2600° F. (1427° C.) for 1 hour. Next, the molten glass was fritted in water, dried and reheated to 2650° F. (14540° C.) in a platinum-rhodium crucible in an electric furnace for two hours. The molten glass was then poured out of the crucible to form a slab and annealed. Samples were cut from the slab, ground and polished for analysis.

The chemical analysis of the glass compositions (except for FeO, $FeS_x$, and $Nd_2O_3$) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will affect the spectral properties of the glass. The FeO and $FeS_x$ content and redox were determined using the glass color and spectral performance computer model developed by PPG Industries, Inc. The content of $Nd_2O_3$ was based on actual batch weight.

The following are approximate amounts of the basic oxides in the experimental melts based on the batch composition:

| | |
|---|---|
| $SiO_2$ | 72.1 wt. % |
| $Na_2O$ | 13.6 wt. % |
| CaO | 8.8 wt. % |
| MgO | 3.8 wt. % |
| $Al_2O_3$ | 0.18 wt. % |
| $K_2O$ | 0.057 wt. % |

The spectral properties shown in Tables 1 and 2 are based on a reference thickness of 0.154 inches (4.06 mm).

The following performance parameters- solar ultraviolet transmittance (SAE Tuv), solar infrared transmittance (TSIR), solar energy transmittance (SAE Tsol), visible (luminous) transmittance (LTA), solar ultraviolet transmittance (ISO Tuv)- are discussed in the Example section. The parameters were calculated as described below:

LTA was calculated using CIE Standard Illuminant "A" with a CIE 1931 Standard (2°) Observer over the wavelength range of 380 to 770 nanometers.

ISO Tuv was calculated according to ISO 9050 (1990-02-15) over the range of 280 to 380 nanometers.

SAE Tuv was calculated according to SAE J1796 (1995-05) over the wavelength range of 300 to 400 nanometers.

TSIR was calculated over the wavelength range of 775 to 2125 nanometers using the Parry Moon air mass 2.0d solar energy distribution at 50 nanometer intervals using the Trapezoidal Rule of integration.

SAE Tsol was calculated according to SAE J1796 (1995-05) over the wavelength range of 300 to 2500 nanometers.

Glass color in terms of dominant wavelength (DW) and excitation purity (Pe), was calculated using CIE Standard Illuminant "C" with a 1931 Standard (2°) Observer, following the procedures established in ASTM E308-90. Color coordinates L*, a*, b* (CIELAB) were calculated using CIE 1964 Standard (10°) Observer over the wavelength range of 380 to 770 nanometers and CIE Standard Illuminant D65 according to the procedures established in ASTM E 308-90.

TABLE 1

Data for Modeled Examples

| | Ex. 1 | Ex. 2 | Ex. 3 | Ex. 4 | Ex. 5 | Ex. 6 |
|---|---|---|---|---|---|---|
| Component | | | | | | |
| Total Iron (wt %) | 0.500 | 0.575 | 0.550 | 0.500 | 0.475 | 0.425 |
| Redox Ratio | 0.375 | 0.375 | 0.425 | 0.383 | 0.383 | 0.383 |
| CoO wt (%) | 0.0015 | 0.0010 | 0.0008 | 0.0005 | 0.0008 | 0.0008 |
| Cr2O3 (wt %) | 0.0007 | 0.0007 | 0.0007 | 0.0005 | 0.0005 | 0.0005 |
| MnO2 wt (%) | 0.0020 | 0.0020 | 0.0020 | | | |
| CeO2 (wt %) | | | | | | |
| TiO2 (wt %) | 0.025 | 0.025 | 0.025 | 0.027 | 0.027 | 0.027 |
| Nd2O3 (wt %) | | | | 0.2500 | 0.2000 | 0.2000 |
| CuO (wt %) | 0.1091 | 0.1091 | 0.1091 | 0.1100 | 0.2000 | 0.3500 |
| FeS(x) (wt %) | 0.00003 | 0.00003 | 0.00003 | 0.00007 | 0.00007 | |
| Performance Data | | | | | | |
| LTA (%) | 72.41 | 71.88 | 71.62 | 71.81 | 71.55 | 71.62 |
| ISO Tuv (%) | 35.20 | 32.75 | 35.32 | 35.58 | 36.20 | 37.37 |
| SAE Tuv (%) | 51.81 | 49.30 | 51.93 | 52.16 | 52.74 | 53.88 |
| SAE Tsol (%) | 50.17 | 47.37 | 46.19 | 49.67 | 50.13 | 51.46 |
| TSIR (%) | 28.28 | 23.95 | 21.54 | 27.19 | 28.38 | 30.94 |
| Color Data | | | | | | |
| DW (nm) | 487.76 | 488.75 | 487.98 | 487.24 | 487.10 | 486.93 |
| Pe (%) | 7.16 | 7.21 | 8.08 | 7.60 | 7.91 | 8.22 |
| D65/10 L* | 89.40 | 89.21 | 89.19 | 89.22 | 89.12 | 89.21 |
| a* | −7.04 | −7.82 | −8.11 | −7.39 | −7.51 | −7.68 |
| b* | −4.05 | −3.60 | −4.45 | −4.42 | −4.69 | −4.96 |

| | Ex. 7 | Ex. 8 | Ex. 9 | Ex. 10 | Ex. 11 |
|---|---|---|---|---|---|
| Component | | | | | |
| Total Iron (wt %) | 0.425 | 0.375 | 0.285 | 0.375 | 0.325 |
| Redox Ratio | 0.375 | 0.375 | 0.375 | 0.383 | 0.400 |
| CoO wt (%) | 0.0020 | 0.0021 | 0.0022 | 0.0014 | 0.0017 |
| Cr2O3 (wt %) | 0.0075 | 0.0100 | 0.0150 | 0.0100 | 0.0150 |
| MnO2 wt (%) | 0.0020 | 0.0020 | 0.0020 | | |
| CeO2 (wt %) | | | | | |
| TiO2 (wt %) | 0.025 | 0.025 | 0.025 | 0.027 | 0.027 |
| Nd2O3 (wt %) | | | | 0.125 | 0.150 |
| CuO (wt %) | 0.1100 | 0.2500 | 0.3500 | 0.2500 | 0.1100 |
| FeS(x) (wt %) | 0.00003 | 0.00003 | 0.00003 | 0.00007 | 0.00007 |
| Performance Data | | | | | |
| LTA (%) | 71.75 | 71.21 | 71.48 | 71.27 | 71.33 |
| ISO Tuv (%) | 37.95 | 39.41 | 43.23 | 39.96 | 43.29 |
| SAE Tuv (%) | 54.40 | 55.75 | 59.17 | 56.09 | 59.06 |
| SAE Tsol (%) | 52.60 | 53.82 | 57.62 | 53.46 | 55.78 |
| TSIR (%) | 33.45 | 36.44 | 43.88 | 35.53 | 39.59 |
| Color Data | | | | | |
| DW (nm) | 488.62 | 488.84 | 489.80 | 489.11 | 489.77 |
| Pe (%) | 6.70 | 6.99 | 6.52 | 6.87 | 6.13 |
| D65/10 L* | 89.02 | 88.81 | 88.89 | 88.86 | 88.77 |
| a* | −7.06 | −7.48 | −7.56 | −7.70 | −7.23 |
| b* | −3.49 | −3.55 | −2.96 | −3.31 | −2.73 |

TABLE 2

Data for Experimental Melts

| | Ex. 12 | Ex. 13 | Ex. 14 | Ex. 15 | Ex. 16 |
|---|---|---|---|---|---|
| Component | | | | | |
| Total Iron (wt %) | 0.375 | 0.423 | 0.428 | 0.429 | 0.612 |
| Redox Ratio | 0.400 | 0.352 | 0.455 | 0.505 | 0.383 |
| CoO (wt %) | 0.0012 | | | | |
| $Cr_2O_3$ (wt %) | 0.0075 | 0.0008 | 0.0007 | 0.0005 | 0.0005 |
| $MnO_2$ (wt %) | | 0.0019 | 0.0018 | 0.0020 | |
| $CeO_2$ (wt %) | | | | | |
| $TiO_2$ (wt %) | 0.027 | 0.026 | 0.027 | 0.027 | 0.027 |
| $Nd_2O_3$ (wt %) | 0.250 | | | | 0.250 |
| CuO (wt %) | 0.1100 | 0.1078 | 0.1084 | 0.1091 | |
| $FeS(x)$ (wt %) | 0.00007 | | | | |
| Performance Data | | | | | |
| LTA (%) | 71.51 | 79.85 | 78.23 | 77.13 | 71.79 |
| ISO Tuv (%) | 40.76 | 36.77 | 39.40 | 40.91 | 30.83 |
| SAE Tuv (%) | 56.98 | 53.80 | 56.45 | 57.81 | 48.15 |
| SAE Tsol (%) | 53.74 | 56.58 | 52.27 | 50.06 | 46.97 |
| TSIR (%) | 34.87 | 34.98 | 27.51 | 23.98 | 22.60 |
| Color Data | | | | | |
| DW (nm) | 487.51 | 491.90 | 489.57 | 488.88 | 488.42 |
| Pe (%) | 7.13 | 3.88 | 5.74 | 6.67 | 7.51 |
| D65/10 L* | 88.98 | 92.43 | 91.98 | 91.61 | 89.25 |
| a* | −7.01 | −5.71 | −6.87 | −7.46 | −8.17 |
| b* | −4.10 | −1.06 | −2.60 | −3.35 | −3.85 |

| | Ex. 17 | Ex. 18 | Ex. 19 | Ex. 20 | Ex. 21 |
|---|---|---|---|---|---|
| Component | | | | | |
| Total Iron (wt %) | 0.514 | 0.511 | 0.571 | 0.572 | 0.571 |
| Redox Ratio | 0.389 | 0.414 | 0.350 | 0.340 | 0.358 |
| CoO (wt %) | 0.0015 | 0.0014 | | | |
| $Cr_2O_3$ (wt %) | 0.0006 | 0.0006 | 0.0007 | 0.0005 | 0.0005 |
| $MnO_2$ (wt %) | | | | | |
| $CeO_2$ (wt %) | | | | | |
| $TiO_2$ (wt %) | 0.003 | 0.025 | 0.032 | 0.032 | 0.032 |
| $Nd_2O_3$ (wt %) | 0.075 | 0.075 | 0.250 | 0.220 | 0.250 |
| CuO (wt %) | | | 0.1687 | 0.1672 | 0.1680 |
| $FeS(x)$ (wt %) | | | | | |
| Performance Data | | | | | |
| LTA (%) | 72.21 | 72.26 | 72.47 | 72.33 | 72.13 |
| ISO Tuv (%) | 35.54 | 35.89 | 26.53 | 27.06 | 27.14 |
| SAE Tuv (%) | 52.94 | 53.32 | 43.04 | 43.59 | 43.64 |
| SAE Tsol (%) | 49.71 | 48.82 | 48.27 | 48.07 | 47.63 |
| TSIR (%) | 26.66 | 24.93 | 25.37 | 25.02 | 24.27 |
| Color Data | | | | | |
| DW (nm) | 486.79 | 486.85 | 490.25 | 490.05 | 489.95 |
| Pe (%) | 7.84 | 8.19 | 6.25 | 6.40 | 6.53 |
| D65/10 L* | 89.39 | 89.47 | 89.44 | 89.39 | 89.31 |
| a* | −7.03 | −7.41 | −8.14 | −8.17 | −8.27 |
| b* | −4.90 | −5.08 | −2.34 | −2.50 | −2.60 |

CONCLUSIONS

As illustrated by the examples above, glass compositions having certain properties can be produced according to the present invention. For example, glass melts produced according to the present invention can yield a 0.154 inch thick glass article having an LTA of at least 70%; an ISO Tuv no more than 40.9%; an SAE Tuv no more than 57.8%; an SAE Tsol of no more than 56.6%; and a TSIR of no more than 35%. The color of a 0.154 inches thick piece of glass according to the present invention can be characterized by a dominant wavelength (DW) between 486.8 and 491.9 nanometers and an excitation purity between 3.9% and 8.2%.

For example, computer models show 0.154 inch thick glass can be made having an LTA of at least 70%; an ISO Tuv no more than 43.3%; an SAE Tuv no more than 59.2%; an SAE Tsol of no more than 57.6%; and a TSIR of no more than 43.9%. The color of a 0.154 inches thick piece of glass according to the present invention can be characterized by a dominant wavelength (DW) between 486.9 and 489.8 nanometers and an excitation purity between 6.1% and 9.2%.

Based on the examples provided above, a 0.154 inch (4.06 mm) thick glass article formed from the glass composition of the present invention exhibits one or more of the following spectral properties: an LTA of at least 70%, for example, at least 72%; (b) an ISO Tuv of no greater than 45%, for example, no greater than 42% or no greater than 40%; (c) an SAE Tuv no greater than 60%, for example, no greater than 55% or no greater than 50%; (d) an SAE Tsol no greater than 60%, for example, no greater than 55% or no greater than 50%; and (e) a TSIR no greater than 45%, for example, no greater than 40% or no greater than 35%. In addition, the blue colored glass of the present invention can be characterized by a dominant wavelength of no greater than 500 nanometers, for example, between 480 and 495 nanometers, or between 485 and 490 nanometers, and an excitation purity no greater than 18%, for example, no greater than 15% or no greater than 10%, at a glass thickness of 0.154 inches. The glass of the present invention can have a redox ratio ranging from 0.15 to 0.65, for example, 0.25 to 0.50, or 0.30 to 0.40.

When the glass produced according to the present invention is used in selected areas of a motor vehicle such as the windshield or front door windows, US law requires the glass to have an LTA of at least 70%. Other countries like Europe, Japan, and Australia require an LTA of at least 75%.

It will be readily appreciated by those skilled in the art that modifications can be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. A float glass composition for forming a blue colored glass, comprising:
   a base glass portion comprising:
   a. $SiO_2$ from 66 to 75 weight percent;
   b. $Na_2O$ from 10 to 20 weight percent;
   c. CaO from 5 to 15 weight percent;
   d. MgO from 0 to 5 weight percent; e. $Al_2O_3$ from 0 to 5 weight percent;
   f. $B_2O_3$ from 0 to 5 weight percent; and
   g. $K_2O$ from 0 to 5 weight percent; and
   additives consisting essentially of:
   total iron from 0.3 to 1.2 weight percent;
   a first additive compound comprising $Nd_2O_3$ in an amount up to 1 weight percent;
   CuO in an amount up to 0.3 weight percent based on the total weight of the glass composition; and
   optionally one or more second additive compounds selected from CoO, $Cr_2O_3$, $V_2O_5$, $CeO_2$, $H_2O$, $SO_3$, $TiO_2$, ZnO, $MoO_3$, NiO, $La_2O_{0.3}$, $WO_3$, $Er_2O_3$, $SnO_2$, and $MnO_2$,
   wherein the redox ratio of the composition ranges from 0.35 to 0.40 and the glass has a blue color characterized by a dominant wavelength in the range of 480 nm to 495 nm and an excitation purity no greater than 18 percent and an Lta of at least 70% at a thickness of 0.154 inches.

2. The glass composition of claim 1, wherein the total iron ranges from 0.4 to 0.8 weight percent.

3. The glass composition of claim 1, wherein the glass has an ISO Tuv no greater than 45%, an SAE Tuv no greater than 60%, an SAE Tsol no greater than 60%, and a TSIR no greater than 45% at a thickness of 0.154 inches.

4. The glass composition of claim 1, wherein the glass has a blue color characterized by a dominant wavelength up to 495 nm and an excitation purity up to 15 percent at a thickness of 0.154 inches.

5. The glass composition of claim 3, wherein the glass has an ISO Tuv no greater than 43% at a thickness of 0.154 inches.

6. The glass composition of claim 3, wherein the glass has an SAE Tuv no greater than 58% at a thickness of 0.154 inches.

7. The glass composition of claim 3, wherein the glass has an SAE Tsol no greater than 57% at a thickness of 0.154 inches.

8. The glass composition of claim 3, wherein the glass has a TSIR no greater than 35% at a thickness of 0.154 inches.

9. The glass composition of claim 1, wherein CoO is present as a second additive compound in an amount up to 40 PPM.

10. The glass composition of claim 1, wherein $Cr_2O_3$ is present as a second additive compound in an amount up to 100 PPM.

11. The glass composition of claim 1, wherein $CeO_2$ is present as a second additive compound in an amount up to 3.0 weight percent based on the total weight of the glass composition.

12. A float glass composition for blue glass, comprising: a base glass portion comprising:
   a. $SiO_2$ from 66 to 75 weight percent;
   b. $Na_2O$ from 10 to 20 weight percent;
   c. CaO from 5 to 15 weight percent;
   d. MgO from 0 to 5 weight percent; e. $Al_2O_3$ from 0 to 5 weight percent;
   f. $B_2O_3$ from 0 to 5 weight percent; and
   g. $K_2O$ from 0 to 5 weight percent;and
   additives consisting essentially of:
   total iron from 0.3 to 1.2 weight percent;
   a first additive compound comprising $Nd_2O_3$ in an amount up to 1 weight percent;
   CuO in an amount up to 0.3 weight percent based on the total weight of the glass composition; and
   optionally one or more second additive compounds selected from CoO, $Cr_2O_3$, $V_2O_5$, $CeO_2$, $H_2O$, $SO_3$, $TiO_2$, ZnO, $MoO_3$, NiO, $La_2O_{0.3}$, $WO_3$, $Er_2O_3$, $SnO_2$, and $MnO_2$,
   wherein the redox ratio of the composition ranges from 0.35 to 0.40, and wherein the glass composition at a thickness of 0.154 inches has a blue color with an LTA of at least 70%, an ISO Tuv no greater than 45%, an SAE Tuv no greater than 60%, an SAE Tsol no greater than 60%, and TSIR no greater than 45.

13. A method for making blue colored glass in a float process, the method comprising providing a glass composition according to claim 1; melting the glass composition; and processing the glass composition in a float glass process to form blue colored glass.

* * * * *